United States Patent [19]

Alba

[11] 4,004,466
[45] Jan. 25, 1977

[54] DRIVE MEANS

[76] Inventor: Louis P. Alba, 279 Highland Blvd., Brooklyn, N.Y. 11207

[22] Filed: Dec. 8, 1975

[21] Appl. No.: 638,421

[52] U.S. Cl. .................................. 74/229; 74/241; 226/15; 226/185; 226/193

[51] Int. Cl.² ...................... F16H 7/00; F16H 7/18; B65H 25/26; B65H 17/22

[58] Field of Search ............ 74/241, 240, 229, 216; 271/34, 275; 226/185, 183, 186, 193, 176, 172, 79, 76, 17, 16, 15

[56] References Cited
UNITED STATES PATENTS

| | | | |
|---|---|---|---|
| 1,603,763 | 10/1926 | Griffin | 226/193 |
| 2,168,572 | 8/1939 | Landis | 226/185 |
| 2,493,056 | 1/1950 | Bartelson | 226/185 X |
| 2,772,879 | 12/1956 | Lorig | 74/241 X |
| 2,977,112 | 3/1961 | Offner | 226/185 |

Primary Examiner—Leonard H. Gerin
Attorney, Agent, or Firm—Bauer, Amer & King

[57] ABSTRACT

Drive means for moving a flat, thin sheet, belt or tape in a straight path without need for guide devices separate from the drive means to limit horizontal wandering of the driven element.

14 Claims, 4 Drawing Figures

U.S. Patent  Jan. 25, 1977  4,004,466
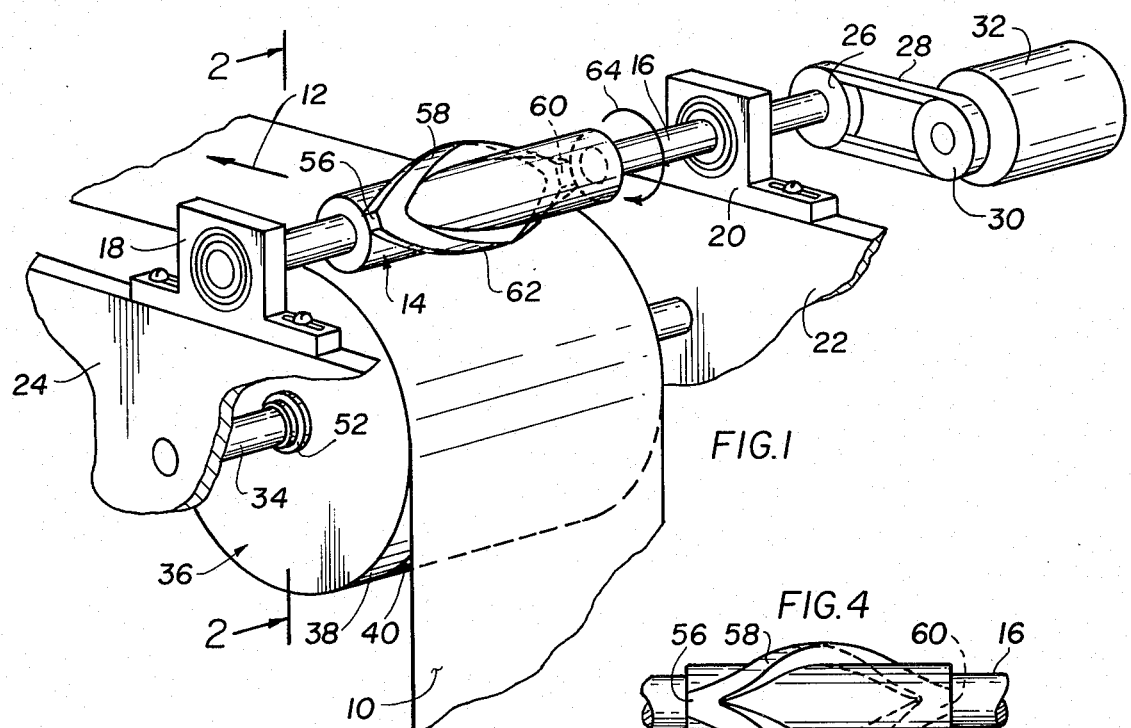
FIG.1
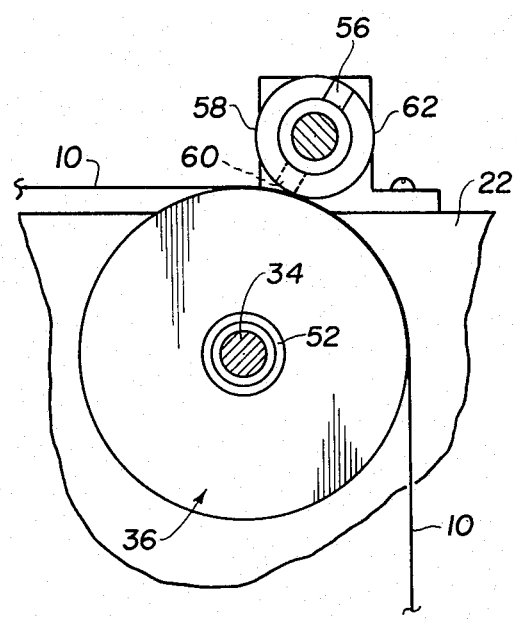
FIG.2
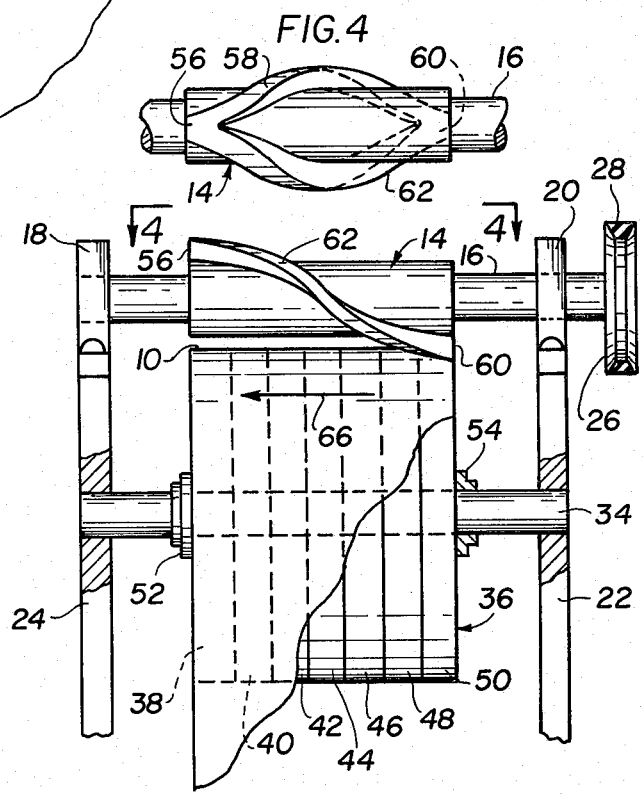
FIG.4
FIG.3

DRIVE MEANS

BACKGROUND

Certain prior art drive means for flat, thin structures such as sheets, tapes and belts have all been designed so as to drive same without regard to the natural tendencies of the driven structure to wander in a horizontal plane as it passes through an opening between drive and idler rollers.

In devices where the horizontal wandering aforedescribed was a problem, it was the practice of the art to provide guide arms or pins on either and both sides of the driven structure to prevent it from wandering from the drive means. It was also the practice to provide the drive means with a variable axis to change the location of driving torque from the driving axis.

It is to the improvement of the aforesaid drive means by a design which limits (eliminates) horizontal wander that this invention has found utility.

More particularly, the drive means of this invention has as an object a drive which will use contact that varies along a horizontal plane in an oscillating fashion to impart motion to a flat, thin sheet, tape or belt such that any tendency of the latter to wander horizontally is negated.

A more specific statement of the object of this invention is to, in combination with an idler roller, disclose a heretofore unheard of drive roller whose drive surfaces are a returning spiral convolution having the form of a development of an elipse on an otherwise plain roller.

Another object of this invention is to form an idler roller from a plurality of discs that are rotatable relative to and independently of each other for supporting a flat, thin sheet, tape or belt with a helical drive means thereabove so that the drive means is operative upon the flat, thin sheet, tape or belt to cause separate discs to idle therewith.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings wherein:

FIG. 1 is an isometric view of a drive means in accordance with this invention;

FIG. 2 is a side view along lines 2—2 of FIG. 1;

FIG. 3 is an end view of the drive means of FIG. 1; and

FIG. 4 is a partial plan view along lines 4—4 of FIG. 3 of a drive roller in accordance with this invention.

DETAILED DESCRIPTION

With more specific regard to FIG. 1, there is shown a flat, thin metal sheet 10 which is being driven in the direction of arrow 12 by means of a drive roller 14 rotatably driven by a shaft 16. As seen shaft 16 is supported by journal blocks 18 and 20 bolted to sides 22 and 24 of a housing or framework within which the drive means of this invention is desired.

As seen the drive for the shaft 16 may be by adapting a pulley 26 to the shaft beyond journal 20. A belt 28 between pulley 26 and another pulley 30 of a motor 32 will drive the shaft 16.

As can also be seen in FIG. 1, the sides 24 and 22 rotatably support a shaft 34 on which a support roller or an idler means 36, comprised of a plurality of low friction, as nylon discs 38, 40, 42, 44, 46, 48 and 50 (See FIG. 3), is held by end collars 52 and 54.

As is seen by the several views, the drive roller 14 of the drive means has a convoluted surface formed as a spiral extension or as a returned helix starting at one end 56 spiraling by means of a raised surface 58 to an opposite end 60, thence back by a spiral surface 62 to end 56. The pitch of the spiral or helical convolute is such as to locate ends 56 and 60 on opposite sides of roller 14. At the same time the path of surfaces 58 and 62 between the ends as well as the surface area A is such that the drive of sheet 10 is by line (point) contact that moves horizontally back and forth.

As can be seen in FIG. 3, the raised surfaces 58 and 62 on roller 14 have greater depth than the space between idler means 36 and roller 14 within which thin flat sheet, tape or belt 10 is located. Also sheet, etc. 10 is of a smaller cross section than the space in the form shown and is flexible to permit it to be pressed downwardly onto the discs 38, 40, 42, 44, 46, 48 and/or 50 progressively as the roller 14 rotates. As can be seen in FIG. 3, sheet, etc. 10 is compressing disc 50 and part of disc 48 due to surface 62 being rotated to drive sheet 10 in the direction of arrow 12. The discs, by being of nylon or other low friction material, permit the compression aforesaid and also permit a non-slip friction drive of the sheet, etc. 10. The edges of surfaces 58 and 62 may be slightly curved or radiused so as to preclude biting or otherwise damaging of the surface of the sheet, etc. Finally as the discs are not keyed to shaft 34, they will not rotate as true idlers until compressed slightly. Collars 52 and 54 serve only to constrain the discs in a horizontal plane without interfering with the relative movement possible between the discs.

OPERATION

While the operation of this invention is readily apparent from the foregoing description of the drawings, it would appear useful to restate it. In operation motor 32 is energized to drive, via belt 28, pulley 26 and thus shaft 16. This will rotate roller 14 clockwise (see arrow 64) to engage drive surface 62 with sheet 10 which may be an endless belt, and the latter on disc means 36.

During the continuous rotation of roller 14, different portions of its drive surfaces progressively engage with the surface 10. For example, if the roller 14 is initially engaged with the surface 10 at the start of its rotation, the point of driving engagement or contact between such roller and surface 10 will progress along the driving surface 62 toward the end 56. This will be in the direction of arrow 66 when the roller 14 rotates in the direction 64. Progressive driving contact then continues without interruption reversing in direction along the surface 58 toward the end 60 which is in a direction opposite to the arrow 66.

This cyclical movement continues without interruption to apply countering forces to the surface 10 that are transverse to the direction of its movement. Thus, if the surface 10 is part of an endless belt, the surface 10 will be walked back and forth along opposite sides of a true center line of its direction of movement. This cyclical walking movement continues without interruption because the transverse driving forces cyclically change in direction and the forces applied in one transverse direction are equal and opposite to those applied in the opposite transverse direction during each cycle of rotation of the roller 14. Hence, even though the surface 10 tends to walk or be moved first in one direction transverse to its given path of movement and then back in the opposite direction transverse to its given path of movement, the essential path of movement of the belt or surface 10 is along a given path. This causes the surface 10 to track cyclically back and forth transverse to its direction of movement but in a resultant essentially straight path of travel.

During this driving movement each of the separate discs of the idler roller means 36, being independently rotatable relative to each other, forms a supporting surface against which the progressive changing driving force of the roller 14 is transmitted. Because the discs of the roller 36 are independent of each other and rotate independently of each other, they reduce what would otherwise be an unequal drag or resistance against the surface 10 that a full roller would generate. Thus, as each idler disc operates under the influence of the drive roller 14, it rotates at the same speed as the drive roller and moves at the same rate as the surface 10 above it and with which it is engaged. Where the surface 10 is part of a continuous loop belt it sometimes happens that one transverse side of the belt is longer than the other transverse side of the belt. Even in such event where such variance in length of the belt's circumference exists, this will not affect the linear direction of travel of the belt because of the independent rotation of the discs of the idler 36 and of the progressive driving engagement of the roller 14. Hence, the drive of the surface 10 is always straight and true. This is also true whether the belt 10 is convex or concave in contour in a direction that is transverse to its length. In such case the drive roller 14 and the engaging configuration of the roller 36 may be congruently and correspondingly shaped in the direction of their axis.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. Drive means for a sheet, tape, loop, belt, etc. that will drive same in a straight path, said drive means comprising:
   support means for the sheet;
   rotatable drive roller means operatively arranged with respect to said support means to move said sheet therebetween,
   said drive roller means having a drive surface that provides cyclic line contact back and forth across the sheet and thereby oppose forces tending to cause said sheet to wander from a straight path.

2. The drive means of claim 1 wherein the support means is at least an idler roller and the drive roller means drive surface is a convoluted surface formed as a spiral extension from one end to another and back again of a preselected pitch.

3. The drive means of claim 1 wherein the support means are a plurality of relatively rotatable discs.

4. The drive means of claim 2 wherein the support means are a plurality of relatively rotatable discs.

5. The drive of claim 1 wherein said drive surface includes a first helix extending from an end about 180° of said drive roller and a second helix extending back about 180° of said drive roller to said end.

6. The drive of claim 3 wherein said drive surface includes a first helix extending from an end about 180° of said drive roller and a second helix extending back about 180° of said drive roller to said end.

7. The drive means of claim 3,
   a shaft supporting said discs,
   wherein the discs are of nylon rotating freely on said shaft and each of said discs supporting the sheet for sequential driving cooperation with said drive roller means.

8. The drive means of claim 1 wherein the support means is under and at least equal to the width of the sheet and is comprised of individually rotatable discs on a common axis to effect cyclic movement of the sheet in a direction transverse to the drive direction of said support means in accordance with the cyclic line contact of the sheet by said drive surface.

9. A drive roller apparatus for moving a flat, thin structure of finite width in an essentially straight path, which apparatus includes,
   a drive roller having a double helix drive surface for cyclic variation of drive contact with the structure,
   and idler means comprised of relatively rotatable discs that support the structure for address to and drive by the drive roller and certain of said discs.

10. In a drive apparatus to move a sheet in a given direction along an essentially straight path,
    a support roller,
    a rotatable drive roller located with respect to said support roller that the sheet moves therebetween,
    said drive roller having a drive surface rotatable therewith to move the sheet in a given direction,
    said surface being contoured to engage the sheet with localized contact that moves progressively and cyclically back and forth along and transverse to the direction of travel of the sheet.

11. In a drive apparatus as in claim 10 with said support roller having a plurality of movable roller discs stacked together adjacent each other to define a combined width at least equal to the transverse extent of the sheet.

12. In a drive apparatus as in claim 10 wherein the drive surface has a width substantially that of the extent of the sheet and said surface being in the form of a double helix extending about a circumferential portion of said drive roller to provide the cyclically variable localized contact.

13. In a drive apparatus of claim 10 wherein the drive surface includes a first element extending helically about 180° of said drive roller.

14. In a drive apparatus of claim 13 wherein the drive surface includes a second element extending back helically about 180° of said drive roller and displaced substantially 180° from said first element.

* * * * *